Aug. 28, 1956

F. J. DECKER 2,760,552

PNEUMATIC SEAT

Filed Nov. 13, 1952

INVENTOR.
FREDRICK J. DECKER
BY

ATTORNEY

INVENTOR.
FREDRICK J. DECKER
BY
ATTORNEY

Aug. 28, 1956  F. J. DECKER  2,760,552
PNEUMATIC SEAT
Filed Nov. 13, 1952  5 Sheets-Sheet 3

INVENTOR.
FREDRICK J. DECKER
BY
ATTORNEY

United States Patent Office 2,760,552
Patented Aug. 28, 1956

2,760,552

PNEUMATIC SEAT

Frederick J. Decker, Elmira, N. Y.

Application November 13, 1952, Serial No. 320,220

21 Claims. (Cl. 155—9)

This invention relates to new and useful improvements in a pneumatic chair, and pertains more particularly to a seat for the drivers of heavy vehicles such as large tractors for trailer units, cross country busses, on and off the highway equipment, locomotives, or the like.

It is well known among manufacturers and operators of conveyances of the above-mentioned classes that it is a very strenuous and fatiguing task to operate such conveyances over long distances or for long continuous periods of time with present seating equipment. This often results in the drivers or operators becoming incapacitated through illness and of necessity taking complete rest of long duration in order to regain their health and strength, to say nothing of the loss in time and money thus occasioned to such persons.

It is a primary object of this invention, therefore, to produce a seat for the drivers of heavy busses, trucks, etc., that will absorb the normal vibratory movement of such vehicles and thereby eliminate much of the stress and strain to which the driver has heretofore been subjected.

In carrying out the above-mentioned object I have produced a seat pedestal which embodies pneumatic support and shock absorbing means so constructed and arranged that the usual vertical movement and road shock of the vehicle will be substantially absorbed, thus eliminating such movements and stresses from being transmitted to the seat frame and to the occupant of the seat.

A more specific object of the invention is to provide simple and efficient means associated with the pneumatic pedestal to adapt the seat to efficaciously support persons of different weights.

Still further objects of my invention are to provide a seat of the above mentioned character that is simple, economical and durable in construction, and which is efficient and dependable in operation.

Other objects and advantages pertaining to the specific construction, operation and arrangement of the parts of my pneumatic seat will more fully appear from the claims and from the following description taken in conjunction with the accompanying drawings, in which:

Figure 1:
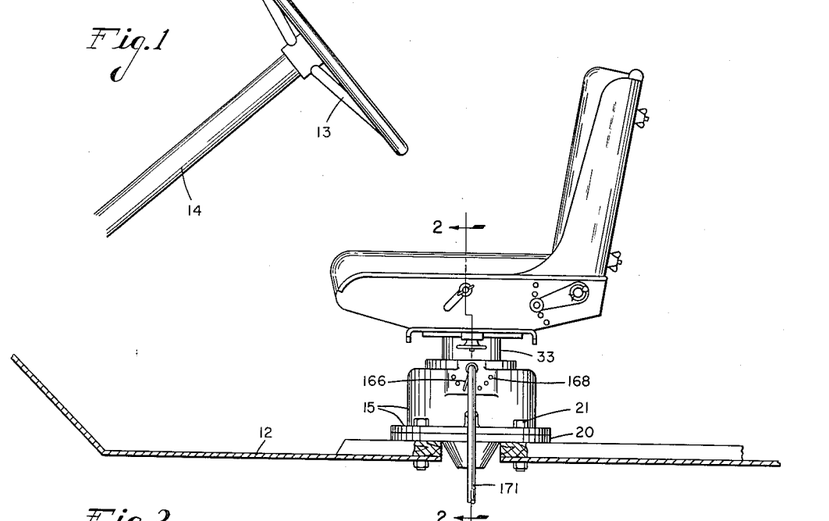
Fig. 1 is a side elevation of a pneumatic chair embodying the various features of my invention and indicating the combination of the seat and pneumatic base unit as mounted on the floor of a vehicle, in cooperative relation with a steering wheel for said vehicle.

In Fig. 1 of the drawings I have indicated my novel chair as being mounted on the floor 12 of a bus, truck, or other vehicle and in cooperative relation with a steering wheel 13 mounted in any suitable manner on the upper end of a conventional steering post 14.

My seat or chair comprises primarily a base or pedestal 15, a seat frame 16 connected to the base to reciprocate vertically with respect thereto, and a back frame 17 hingedly connected to the seat frame to swing about a horizontal axis with respect to the latter frame. A description of the seat frame and back frame are omitted from this application and form the subject matter of a divisional application about to be filed.

Figure 2:
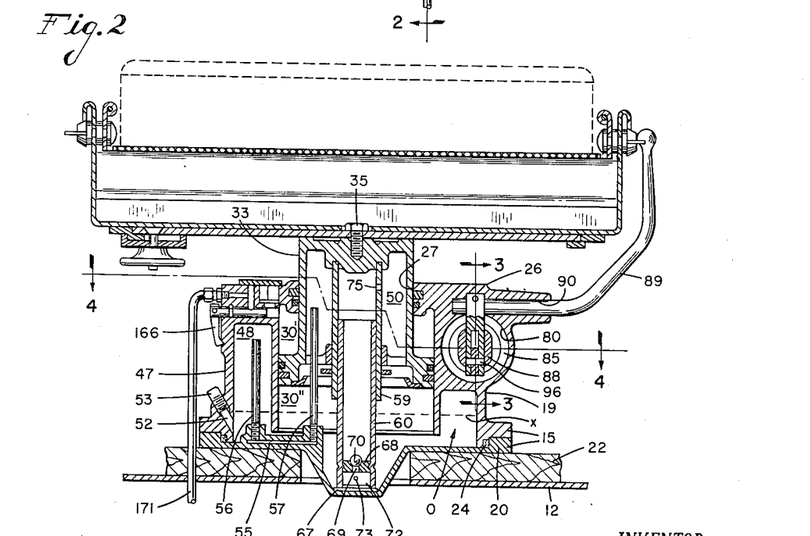
Fig. 2 is a vertical transverse sectional view of the chair taken substantially on the plane indicated by line 2—2 of Fig. 1.

As indicated more clearly in Fig. 2 of the drawings, the base 15 includes a vertically disposed cylindrical body member 19 having its lower end closed by a base or cover plate 20 secured thereto by bolts or screws 21. The base 15 may, as shown, be mounted on a spacer 22 positioned between the base plate 20 and the floor 12 of the vehicle. The spacer 22 may be composed of wood or other suitable material and may be of such a thickness as to compensate for different positioning of the steering wheel 13 with respect to the floor 12 in different vehicles. A packing gasket 24 may be provided as shown to maintain a fluid tight connection between the base plate 22 and body member 19.

The upper closed end 26 of body member 19 is provided with a circular opening 27 and a pendant cylindrical wall 28 of greater diameter than opening 27 and which terminates a short distance above the lower end of the body member 19 and the base plate 20. The inner surface of the wall 28 is bored smooth to provide a piston chamber 30 which slideably receives the lower end 31 of a differential piston 32. The upper end portion 33 of the piston 32 is of less diameter than the lower end 31 thereof. The upper end of piston portion 33 is secured, as by a cap screw 35, to a seat base plate 36 which will hereinafter be more fully described. A pressure ring 38 and an oil ring 39 are mounted in suitable grooves 40 and 41 respectively, provided in the end 26 adjacent the opening 27 to prevent escape of air around the piston through said opening. Likewise, a pressure ring 43 and oil ring 44 are mounted in suitable grooves 45 and 46 respectively, provided in the periphery of the end 31 of piston 32 to prevent escape of fluid under pressure between said piston end and the cylinder wall 28. (See also Fig. 5.)

As shown in Fig. 2, the outer diameter of the cylinder wall 28 is less than the inner diameter of the outer wall 47 of the body member 19 so as to provide an annular pressure chamber 48 surrounding the piston chamber 30. Furthermore, the piston 32 is a hollow member provided with a cylindrical chamber 50 which is constantly maintained in communication with that portion 30″ of chamber 30 which is located below the piston 32.

It will now be obvious that chambers 48, 50, and the lower portion 30″ of piston chamber 30 have a much greater combined volume capacity than that of the upper portion 30′ of the piston chamber 30 which is located above the lower end 31 of piston 32. The effective combined volume or capacity of chambers 48, 30″, and 50 may be readily controlled by the addition or subtraction of a quantity of liquid as 0 to the interior of body member 19. A good grade of lubricating oil is preferably used for this purpose which is also used to lubricate certain moving parts within the base as well as to assist in controlling the vertical action of piston 32 and the seat structure carried thereby, as will hereinafter be more fully explained. The oil 0 may be easily supplied or removed from the interior of body member 19 through an opening 52 which is normally closed by a suitable plug 53. The oil level is normally maintained above the lower end of the cylinder wall 28 as indicated by broken line X, Fig. 2. In order to always maintain an air connection between the pressure chamber 48 and chambers 50 and 30″, I have provided a U-shaped fluid conduit comprising a radial passage 55 in the base plate 20 which is connected at its outer end with the upper portion of pressure chamber 48 by the vertical tube or pipe 56 and at its inner end with the chamber 50 by the vertical tube or pipe 57. The oil level is thus maintained substantially constant regardless of fluctuations in air pressure in the connected chambers 48, 50 and 30.

As shown in Fig. 2, the means for lubricating the piston 32 consist of a pair of telescoping tubes 59 and 60. One of the tubes, as 59, is secured to or cast integral with the upper end of piston 32 and extends downwardly through a boss 61 connected to the piston near the lower end thereof by a relatively thin web or wall 62. The tube 60 is slideably received in tube 59 and has the lower end thereof extended into a sump 65 formed in the base plate 20. Tube 60 is maintained in its lowermost position by an expansion lock ring 67. A flat disk-like valve seat 68 is secured in tube 60 a short distance above the lower end of said tube. Valve seat 68 has a central aperture 69 which is normally closed by a ball valve 70 positioned at the upper side of the valve seat. The space 72 formed in tube 60 beneath valve seat 68 is connected with the exterior of the tube by apertures 73 so that oil in sump 65 will flow into said space 72 and thence up through the valve seat aperture 69 into the interior of tubes 60 and 59 when pressure on valve 70 is diminished sufficiently as by upward movement of piston 32 and tube 59. In other words, as piston 32 and tube 59 ascend and descend, pressures thus produced in tubes 59 and 60 will pump oil upwardly through the tubes until it overflows through opening 75 in tube 59 at the upper end thereof. The oil then passes downwardly onto plate 62 and thence through openings 63 in plate 62 into a trough 76 formed by a flanged ring 77 secured to the lower end of piston 32. The oil may then pass through apertures 78 formed in piston 32 to the oil groove 46 and ring 44, as more clearly seen in Fig. 5, for lubricating the end 31 of piston 32.

Figure 3:
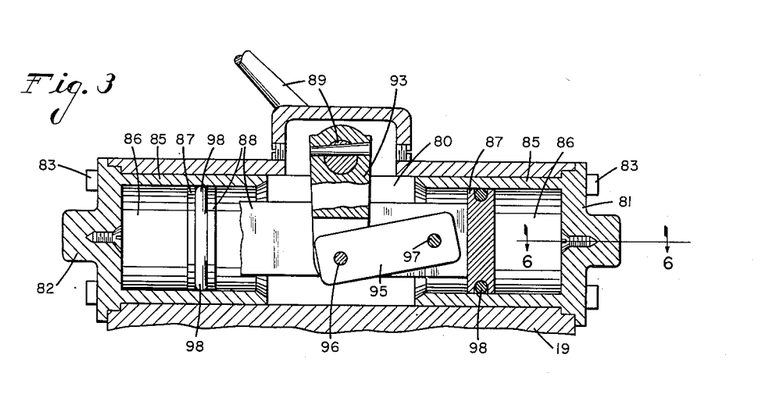
Fig. 3 is an enlarged detail vertical sectional view through the fluid pump taken substantially on the plane indicated by line 3—3 of Fig. 2.

The number 80 designates a horizontally disposed pump chamber formed integral with the body member 19 located near the upper end thereof and spaced from chamber 48. The opposite ends of chamber 80 are closed by cylinder heads 81 and 82 removably secured in place by bolts or screws 83. Each of the cylinder heads 81 and 82 has an integral tubular sleeve 85 which projects into the corresponding end of pump chamber 80 with a close fit to prevent leakage. The interior of the sleeves 85 are in coaxial alignment to provide piston chambers 86 which reciprocally support the heads 87 of a piston 88. Piston 88 is manually operated by a hand lever 89 having one end journaled in a suitable bore 90 provided in body member 19 adjacent the upper side of pump chamber 80, as shown in Figs. 2 and 3. The outer end of lever 89 extends some distance outwardly and upwardly from the body member 19 to a position at one side of the seat structure carried by piston 32 to form a handle 91 by which the occupant of the seat may readily manipulate piston 88. Lever 89 is operatively connected with piston 88 by a rock arm 93 secured to the lever and which projects downwardly therefrom into an elongated slot 94 in piston 88. The lower end of arm 93 is operatively connected to piston 88 by a link 95 and pins 96 and 97. (See Figs. 3 and 4). The heads 87 of piston 88 have suitable pressure rings 98 for preventing leakage of fluid past the heads.

The cylinder heads 81 and 82 are each provided with valve-controlled passages through which air may be supplied by the action of piston 88 to and from pressure chamber 48 and chambers 30″ and 50 connected therewith. For instance, cylinder head 81 has an inlet opening 100 which may be connected to the exterior of the vehicle cab by a pipe or tube 101 connected with the opening and which extends downwardly through the floor 12. The opening 100 communicates with one end of a bore 103 in which is fitted an intake valve member 104. The valve member 104, in this instance, comprises a tubular body member 106 having an enlarged head 107 which is closely received in bore 103 and a reduced end portion 108 of less diameter than bore 103. Radial apertures 109 connect the bore 103 with a central bore 110 provided in valve member 104. In bore 110 is a tubular valve 112 comprised of flexible material, such as rubber or the like, positioned to normally close the inner ends of apertures 109. A bushing 113 secured to the body 106 by pin 114 maintains valve 112 against accidental displacement. A flat head stop screw 116, screwthreaded in the cylinder head 81, removably maintains the valve body 106 in the bore 103 with the inner end thereof substantially flush with the adjacent end of piston chamber 86.

Figure 6:
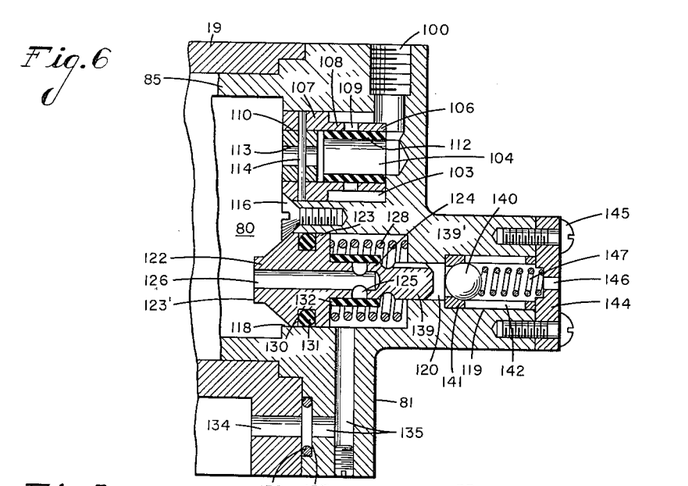
Fig. 6 is an enlarged detail horizontal sectional view taken on line 6—6 of Fig. 3, showing the valve controlled fluid passages at the end of the pump piston chamber.
Figures 7, 9:
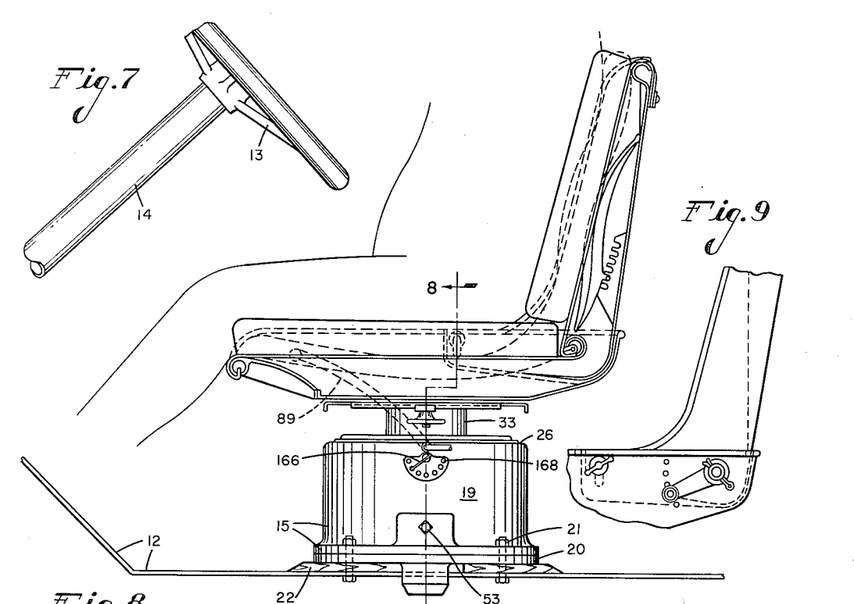
Fig. 7 is a partial side elevation and longitudinal vertical section of a modification of my pneumatic chair shown in Fig. 1 of the drawings.
Fig. 9 is a detail side elevation of the rear lower portion of the seat shown in Fig. 7.

The cylinder head 81 is provided with a second bore 118 spaced laterally a short distance from bore 103 at the inner face of the head and which is connected with a second bore 119 at the outer end of the head by port 120. In bore 118 is mounted for axial movement an exhaust valve member 122 having head portion 123 slideable in bore 118 and a valve supporting portion 124 of less diameter than head 123 and bore 118. Valve member 122 has a plurality of radially disposed apertures 125 in the portion 124 which are adapted to connect the bore 118 with a central fluid passage 126 provided in the valve member to extend from the inner end thereof past the apertures 125, as illustrated in Fig. 6. An expansion spring 128 urges valve member 122 to its normal position against the stop screw 116 and with a reduced end portion 123′ of the head 123 projecting a short distance into the cylinder chamber 86.

The head 123 is also provided with an annular peripheral groove 130 in which is a pressure ring 131 composed of rubber or the like. Mounted on the valve supporting portion 124 is a flexible tubular valve 132 composed of rubber or the like and which normally closes the outer ends of apertures 125. The bore 118 is connected with chamber 48 by a fluid passage 134 provided in the body member 19 and an L-shaped fluid passage 135 provided in the cylinder head 81, see Figs. 4 and 6. An annular packing ring 136 positioned in a counterbore 137 in head 81 hermetically seals the connection between the head 81 and body member 19 at the junction of passages 134 and 135. Valve member 122 has a plunger 139 that extends into the port 120 and which is normally spaced from but adapted to engage with a ball valve 140 carried in bore 119 to move said valve from its seat 141 positioned at the inner end of bore 119. A valve cage 142 mounted in bore 119 supports ball valve 140 and maintains the valve seat 141, which is of ring formation, in position. The valve cage 142 is maintained against outward movement from bore 119 by cover plate 144 secured to the head 81 by screws 145. Cover plate 144 is provided with an aperture 146 which connects bore 119 with the outside atmosphere. An expansion spring 147 yieldingly maintains valve 140 in contact with the valve seat 141. The plunger 139 has a groove 139' extending longitudinally in the periphery thereof for the passage of fluid through port 120 when valve 140 is moved from its seat. Likewise, valve cage 142 has a plurality of longitudinal slots 142' for passage of fluid around valve 140 when said valve is moved out of engagement with valve seat 141.

Cylinder head 82 is constructed similar to head 81 with the exception that the bore 119 and port 120 together with the ball valve 140 and plunger 139 associated therewith in head 81 are not provided for or used as in said head 82. In other words, these elements together with their functions are required in but one of the cylinder heads, although they may be utilized in both cylinder heads if it is desired to do so, as will be obvious from a description of the operation of piston 88 and the valved fluid passages in cylinder heads 81 and 82. For instance, when piston 88 is reciprocated by the manual operation of lever 89, fluid, as air, will pass into the piston chamber 86 at the rearward end of the piston through the corresponding inlet opening 100, bore 103 and apertures 109 at atmospheric pressure. Inasmuch as the air pressure at the interior of valve 112 is below atmospheric pressure, due to the direct communication thereof with the piston chamber 86 in which a partial vacuum is being produced by movement of piston 88, valve 112 will be collapsed sufficiently to allow the air to pass through apertures 109 and then between the valve and the wall of bore 110 to the interior of valve 112, thence through the opening in bushing 113 into the adjacent piston chamber 86. At the same time air at the forward end of piston 88 will be forced out through adjacent fluid passage 126 and apertures 125, thence between valve 132 and its support 124 into bore 118. The air then passes through the connected passages 135 and 134 into the chamber 48. It is thus seen that air will be supplied to chamber 48 from first one piston chamber 86 and then the other piston chamber 86 as long as piston 88 is operated or until the air pressure in chambers 48, 30'' and 50 is sufficient to maintain piston 32 at a predetermined height under a predetermined load, depending upon the size and weight of the person occupying the seat carried by piston 32. It will now be obvious that air in chamber 48 and therefore chambers 30'' and 50 will be prevented from escape therefrom due to the fact that valves 132 will be firmly maintained in engagement with the supporting members 124 and thus prevent backward flow of air through apertures 125 and passages 126 into the corresponding piston chambers 86. If it is desired to reduce the air pressure in chambers 48, 30'' and 50 at any time, as when a person of lighter weight is to occupy the seat mounted on piston 32, or the occupant requires a change of elevation for any reason, this may readily be accomplished by moving the piston 88 to its extreme position at the right, as viewed in Figs. 4 and 6, and as indicated by broken lines in the latter figure. As piston 88 approaches the cylinder head 81 it engages projection 123' of valve member 122 and forces said valve member axially against the action of spring 128 and effects the outward movement of ball valve 140 away from valve seat 141 by the engagement of plunger 139 with said valve. Air may now freely flow from chamber 48 out through passages 134, 135, bore 118, groove 139' and thence through slots 142' around valve 140 to the interior of cage 142 and then out through aperture 146 to the atmosphere. As the air pressure in chambers 48, 30'' and 50 is reduced to the required amount, the operator actuates lever 89 to move piston 88 away from cylinder head 81, whereupon valve member 122 will be returned by spring 128 into engagement with stop screw 116. Plunger 139 is thus moved out of contact with valve 140 which is then returned to its normal position in contact with valve seat 141 by action of spring 147, and thus prevents further escape of air from chamber 48 and its associated chambers.

It will now be apparent that the vertical vibratory or reciprocal movement of a vehicle having my pneumatic chair mounted thereon, incident to the movement of the vehicle over a rough or uneven surface or roadway, will be largely dampened or absorbed between the chair base 15 and the seat frame 16 by the air pressure in the base supporting the differential piston 32. However, it has been found that a certain percent of this vertical reciprocal movement of the vehicle, when it is excessive, may be transmitted to the seat frame 16 and therefore I have provided a novel shock absorbing device designed to further dampen the vibration of the seat frame produced by road shocks and thereby provide for the maximum comfort and minimum fatigue of the occupant of the seat.

Figure 5:
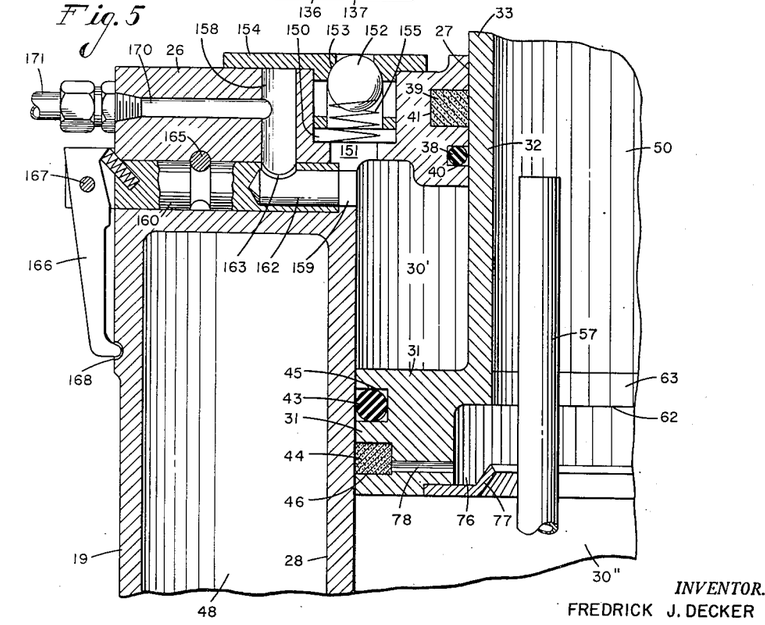
Fig. 5 is an enlarged detail vertical sectional view taken on line 5—5 of Fig. 4.

This shock absorbing device includes a valve-controlled air intake bore 150 provided in the upper end wall 26 of body member 19 and which is connected with the chamber portion 30' of chamber 30 by a port 51, see Figs. 2 and 5. The ball valve, as 152, for controlling passage of air through bore 150 is normally maintained in engagement with a valve seat 153 formed in a cover plate 154 by a coil spring 155. Plate 154 is secured to the upper end 26 of body member 19 by screws 156, and is utilized to close the upper end of a second air intake passage 158 which extends downwardly in close spaced relation to intake bore 150. The lower end of passage 158 communicates with a horizontally disposed bore 159 which in turn is in communication with chamber 30'. In bore 159 is rotatably mounted a cylindrical valve member 160 which has its inner end provided with a short axial passage 162. A port 163 provided in valve 160 to align with passage 158 is of substantially the same diameter as said passage 158 and normally maintains passages 158 and 162 in greater or less direct communication with each other depending upon the position of valve 160. A pin and groove connection 165 associated with valve 160 and member 19 maintains said valve against axial displacement, while permitting free rotary movement thereof. Valve 160 extends outwardly a short distance beyond the adjacent side of member 19 and is releasably locked against rotary movement by a spring actuated pawl 166 pivoted to valve 160 at its outer end at 167 and which is adapted to engage in any selected one of a series of apertures 168 provided in body member 19 in spaced concentric relation with valve 160, see Figs. 1 and 5. Passage 158 is maintained in constant communication with the outside atmosphere by fluid passage 170 to any desirable place as to the exterior of the cab in which my pneumatic chair is mounted.

It will now be obvious that when relative axial movement of piston 32 and pedestal 15 is produced to effect enlargement of chamber 30', air at atmospheric pressure may rush in to said chamber to at least partially satisfy the vacuum therein from around valve 152 and through port 151 and also through passages 158, 162 and 159. The inrush of air through port 151 will be quite free due to the relatively light weight of spring 155 while the passage of air through passages 158, 162 and 159 will be more or less restricted depending upon the position of valve 160 rotatively. That is, if valve 160 is in a first position wherein port 163 is in full registration with passage 158, a maximum quantity of air may obviously pass through the port depending upon the capacity thereof and of the fluid passages associated therewith. If, on the other hand, valve 160 is rotated so as to bring port 163 into only partial registration with passage 158, the passage of air through said port will, of course, be restricted at this point, depending upon the degree valve 160 is rotated from its first position. It now follows that when the relative axial movement of piston 32 and pedestal 15 is reversed, so that the capacity of chamber 30' is reduced thereby, the outward rush of air from said chamber will be restricted when compared with the inward rush of air as explained above. This is due to the fact that no air may pass outwardly through port 151, inasmuch as valve 152 is closed by its spring 155 and all outward going air must pass through the restricted passage provided at port 163. This results in this latter relative movement of piston 32 and pedestal 15 being checked. The restricted passage at 163 thus constitutes a choke outlet and by varying the amount of said opening the "softness" of the ride may be regulated. In general, maximum opening at 163 gives a "soft" ride but one which may cause too great an amplitude of movement to suit the user. Decreasing the area of opening of 163 "hardens" the ride and decreases the amplitude of movement of the seat.

One of the factors to be considered in the design of a vehicle seat is to avoid large amplitudes of movement of the seat not only for the comfort of the driver but also so that the driver's eyes will not be shifted out of his range of vision through the windshield at least to any substantial extent. With a large range of movement, the driver's view will be cut off by the lower edge of the windshield and the hood when the wheels of the truck drop into a road depression and upon recoil of the vehicle springs, the driver will be thrown upward so that his vision is again cutoff. Moreover, these oscillations, when traveling over rough road should be quickly dampened out not only because they cause the driver discomfort, spinal disorders and it is believed sacroiliac displacement but also such substantially continuous vertical oscillation as might seriously interfere with road visibility.

When the driver first seats himself, he adjusts the seat to bring his eyes at the proper level for visibility by pumping air into the chambers 48, 50 and 30" or releasing air therefrom in the manner set forth above. This adjustment is dependent upon the height and weight of the driver and the relationship at which he desires to sit with respect to the steering wheel. He then adjusts the seat forwardly or rearwardly in a manner to be described to position himself in the desired forward and back relationship with respect to the steering wheel. Then as he rides along he can adjust the amount of recoil movement by adjusting the throttle valve 160.

One of the factors governing the riding comfort of the driver is the relatively large volume of the chambers 48, 50 and 30". It can be appreciated that if this volume were small, for a given downward movement of the piston, the increase in air pressure below the piston would be so rapid that the driver would be affected substantially as though he were seated on a seat rigid with respect to the vehicle chassis. Space limitations in commercial trucks do not permit sufficient volume directly below the piston (the chambers 50 and 30") to accomplish the desired "soft-ride." Therefore, I have provided the chamber 48 surrounding the cylinder and have provided communication between the chambers 48 and 30" to greatly augment the effective volumetric capacity below the piston. The cross-sectional area of the piston exposed to the pressure of air below the piston should be ample otherwise it would require a considerable increment in the pressure of air below the piston to adjust the seat for a 200 pound man as compared to a 150 pound man requiring considerable use of the hand pump. Moreover, with a small lower side piston area, the piston would literally "sink" through the air when a sizable depression in the road was encountered. This would require a stop to limit downward movement of the piston because of cab space limitations and the desirability of limiting the amplitude of movement of the seat to a range which will not cut off road visibility at least to any appreciable extent when the vehicle is traveling over rough terrain. The use of a stop would be extremely uncomfortable for the driver.

Contrary to the above, the volume of the chamber above the piston should be preferably considerably smaller than the volume below the piston; atmospheric air should be automatically admitted to this chamber on the downstroke of the piston; the area of the upper side piston should be small as compared to the area of the lower side piston; and the pressure in the upper chamber 30' on the upstroke of the piston should be under the control of the driver while driving so that, if desired, he can adjust the pressure in accordance with the terrain over which he is traveling. With a small volume of air above the piston the pressure therein rises rapidly, quickly dampening out recoil and controlling the degree of upward vertical movement. By adjusting the throttle valve 160 the increment in pressure in chamber 30' may be controlled by the operator to control the dampening effect and control the speed of vertical upward movement of the seat in direct ratio to the downward movement caused by truck spring reactions.

The above are important advantages of the seat of my invention for it provides a seat mechanism wherein the seat secured to and carried by the piston does not have a vertical amplitude of movement corresponding to that of the base or vehicle when traveling over rough terrain. The large peaks and valleys of movement of the seat base are dampened out in a manner which cannot be accomplished by springs, rubber or hydraulic mechanisms.

Figure 8:
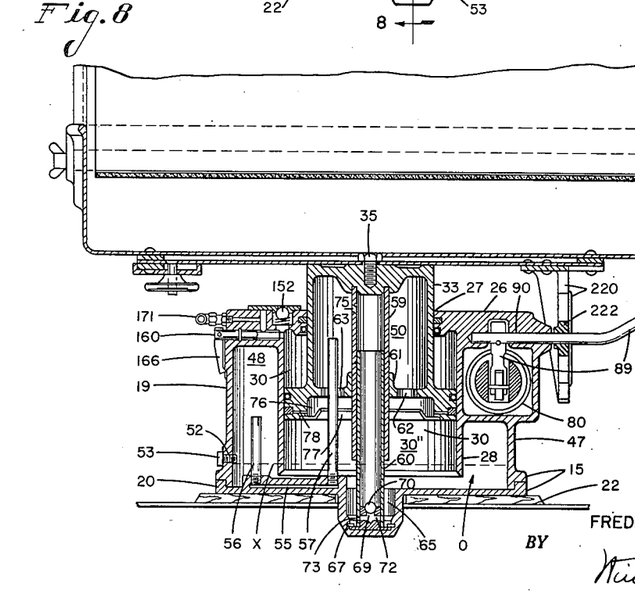
Fig. 8 is a vertical transverse sectional view of my modified chair taken substantially on the plane indicated by line 11—11 of Fig. 7.
Figure 10:
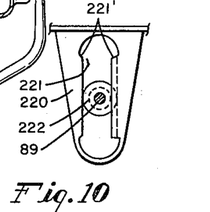
Fig. 10 is a detail vertical face view of a stabilizing bracket for the seat shown in Fig. 8.

I have provided the seat, as shown in Figs. 8 and 10, with a stabilizer bracket 220 which is secured to the underside of base plate 36 and extends downwardly therefrom at the side of pedestal 15 from which hand lever 89 projects, and in the vertical plane of said lever. Bracket 220 has a vertical slot 221 through which lever 89 extends. A roller 222 of slightly less diameter than the distance between the sides 221' of slot 221 is rotatably mounted on lever 89 in position to engage one or the other of sides 221', as piston 32 and therefore base plate 36 and the seat carried thereby, move up and down with respect to pedestal 15 and thereby maintain piston 32 and the chair seat carried thereby against rotary movement about the axis of said piston.

Figure 4:
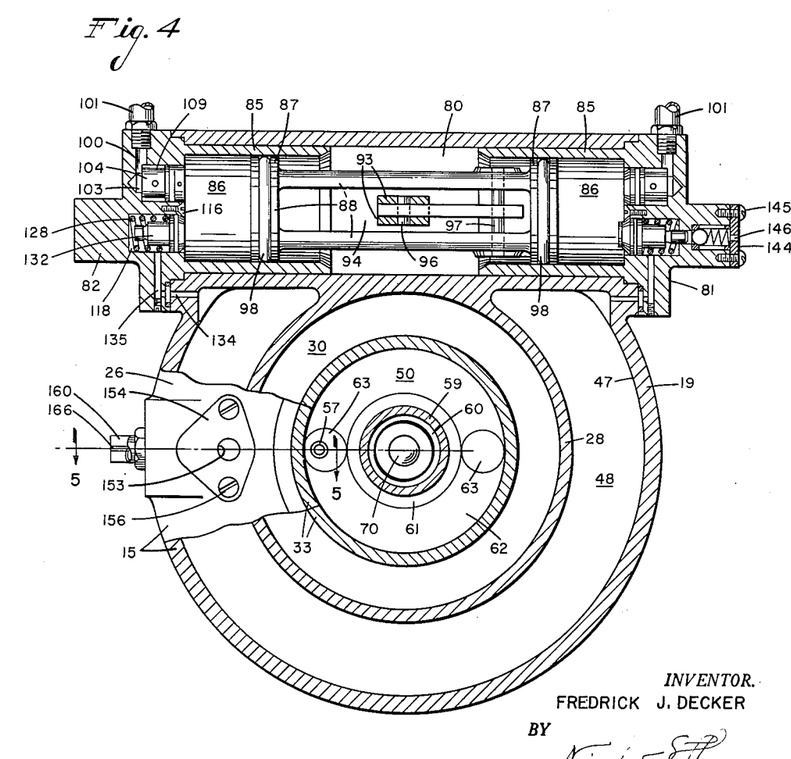
Fig. 4 is an enlarged detail transverse view partially in section and partially in elevation, taken on line 4—4 of Fig. 2.
Figure 11:
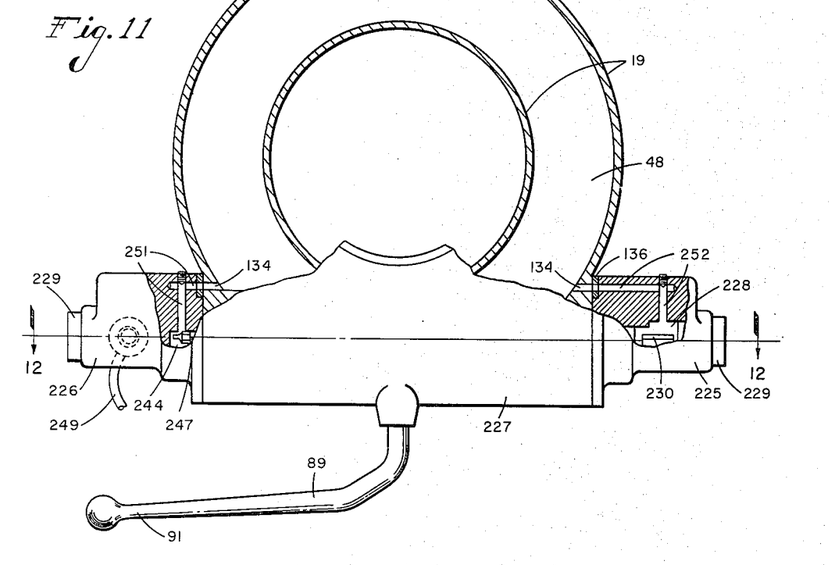
Fig. 11 is a partial horizontal section showing a modification of my fluid pressure control mechanism illustrated in Figs. 2, 3 and 4.
Figure 12:
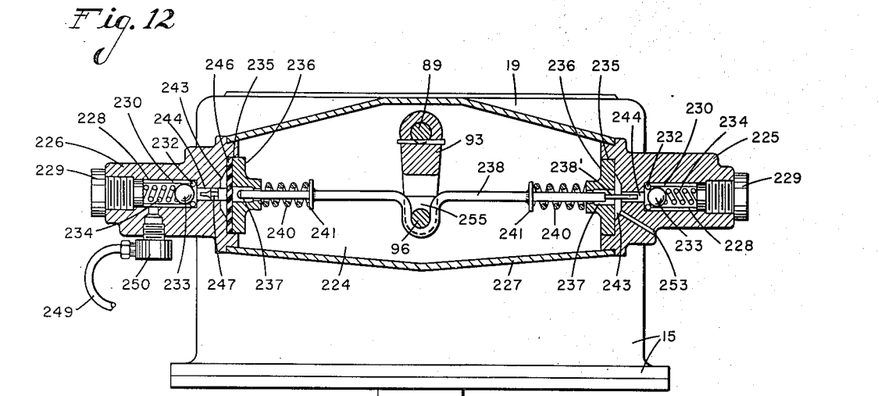
Fig. 12 is a detail vertical section taken in the plane of line 15—15 of Fig. 11.

In Figs. 11 and 12 I have illustrated a modified structure adapted to be substituted for the pump mechanism shown in Figs. 2, 3 and 4, for supplying fluid, as air, under pressure to chamber 48 and chambers 50 and 30" associated therewith and for relieving such pressure as desired. The apparatus shown in Figs. 11 and 12 is adapted more particularly to be used in conjunction with an air pressure system carried by the vehicle in which my pneumatic chair is mounted, and which may include an air compressor and reservoir commonly used with air operated breaks. As illustrated, the pedestal body member 19 has a horizontally disposed chamber 224 which replaces pump chamber 80 hereinbefore described. Opposite ends of chamber 224 are closed by heads 225 and 226 secured to the wall 227 of said chamber in any suitable manner. Heads 225 and 226 are each provided with an axially disposed bore 228 extending inwardly from the outer ends thereof and which is closed by a plug 229 screw threaded in the outer end thereof. In each bore 228 is a valve cage 230 mounted between a ring-like valve seat 232 positioned at the inner end of said bore and the inner end of the corresponding plug 229. A ball valve 233 loosely mounted in each valve cage 230 is yieldingly maintained in engagement with its respective valve seat 232 by a coil spring 234 mounted intermediate the valve and the adjacent plug 229. The inner face of each head 225 and 226 is provided with a coaxial counter bore 235 in which is mounted a guide plate 236 having a central hole 237 in which is reciprocatively mounted the respective end of a valve actuating rod 238. A pair of coil expansion springs 240 mounted on rod 238 between the adjacent plate 236 and a respective flange 241 resiliently maintain the valve actuating rod 238 in an intermediate position in chamber 224 and at the same time hold the plates 236 in cooperative contact with heads 225 and 226 respectively. Each head 225 and 226 is provided with a tapered recess or chamber 243 coaxial therewith at the bottom of counter bore 235 and which is connected with the bore 228 of the head by a restricted passage 244. The end of thrust rod 238 adjacent head 225 has an extension 238' of less of less diameter than that of passage 244 on head 225 and which extends into said passage to within a short distance of the adjacent valve 233 when rod 238 is in its normal intermediate position. The other end of rod 238 terminates just short of the outer face of the adjacent plate 236 and a flat resilient actuating disk 246 mounted in the counter bore 235 of head 226 between the adjacent plate 236 and the bottom of said counter bore. A valve actuating pin 247 is loosely mounted in passage 244 of head 226 intermediate disk 246 and ball valve 233. The bore 228 of head 226 is connected with any suitable source of fluid pressure (not shown) carried by the vehicle in which my pneumatic chair is mounted, by a tube 249 and a coupling unit 250. Furthermore, passage 244 of head 226 is maintained in fluid connection with the chamber 48 and passage 134 adjacent thereto by an L-shaped fluid passage 251 provided in head 226. In a similar manner bore 228 of head 225 is maintained in communication with chamber 48 and the adjacent passage 134 by an L-shaped fluid passage 253 in head 225. A second fluid passage 253 in head 225 and connected with chamber 243 thereof, maintains passage 244 in communication with the outside atmosphere. Valve actuating rod 238 is moved axially against the action of springs 240 by lever 89 which is journaled in chamber wall 227 to extend through chamber 224 in intermediate heads 225 and 226 at one side of rod 238. Lever 89 is operatively connected to rod 238 by link 93 secured to the lever and a pin 96 carried by link 93 and positioned in a U-shaped recess 255 provided in rod 238.

It will now be understood that when the occupant of my pneumatic chair desires to increase the fluid pressure in chamber 48 and chambers 30'' and 50 associated therewith, all that is required is for him to manipulate lever 89 so as to move thrust rod 238 toward head 226 until disk 246 is flexed into recess 243 and into engagement with pin 244 and cause said pin to move ball valve 233 from its seat 232. Fluid, as air, under pressure may then flow from its source through tube 249 to the interior of bore 228 and thence through valve seat 232 and passages 244, 251 and 134 to chamber 48. When the desired fluid pressure has thus been obtained in chamber 48 and its associated chambers, lever 89 is released and rod 238 is returned to its intermediate position by the compressed spring 240 and valve 233 will be returned into engagement with its seat 232 by spring 234. If, on the other hand, it is desired to reduce the fluid pressure in chambers 48, 30'' and 50, this may be readily accomplished by the occupant of the seat effecting movement of actuating rod 238 toward head 225 through the medium of lever 89, link 93 and pin 96. As rod 238 thus moves, the rod extension 238' contacts adjacent valve 233 and moves it out of engagement with its seat 232, whereupon fluid in chambers 48, 30'' and 50 may flow through passages 134 and 252 into bore 228 and thence through valve seat 232, passage 244, recess 243 and passage 253 to atmosphere. As soon as the fluid pressure in chambers 48, 30'' and 50 has been sufficiently reduced, lever 89 is released, and rod 238 and valve 232 will be returned to their normal positions by compressed spring 240 and valve spring 234, respectively, thereby preventing further escape of fluid from these pedestal chambers.

It will now be understood that, although the pedestal assembly and the seat and back assemblies of my improved chair for drivers of vehicles may be used independently of each other, each assembly is essential to the remaining assebleis, to be used and operated in conjunction therewith in order to produce a chair structure which is not only readily applicable to individuals of different statures, but which will produce the maximum degree of ease and comfort for the occupant of the chair.

As previously indicated, the device composing my invention is particularly applicable for use in supporting seats in omnibuses, trains, trucks, and the like. With certain obvious modifications, the device of the present invention can also be used as a supporting means for cots and beds in ambulances, etc., where it is essential that no shock be transferred from the driving gear of the vehicle to the bed or cot supported in the vehicle. Certain changes may be made in the specific structure illustrated for purposes of explanation without departing from the principle of my invention. For instance, the form, size, shape and relation between the movable elements may be changed to a certain extent without a change in the results secured, as long as the principles of my construction are followed.

Other modes of applying the principle of my invention may be employed instead of the one explained, change being made as regards the mechanism herein disclosed, providing the means stated by any of the following claims or the equivalent of such stated means, be employed.

I, therefore, particularly point out and distinctly claim as my invention:

1. A seat pneumatic structure of the character described, comprising in combination, a seat frame member, a base member, means operatively connecting the frame and base members including relatively reciprocative piston and cylinder elements defining spaced-apart air pressure chambers of unequal capacity, a valve-controlled fluid passage connected with the smaller of the air chambers adapted to freely admit air at atmospheric pressure to said chamber as the volume thereof is increased by relative movement of the piston and cylinder in one direction, a separate valve-controlled fluid passage also connected with the said smaller chamber adapted to provide for a restricted flow of air therefrom as the volume thereof is reduced by relative movement of said piston and cylinder in the opposite direction, and separate means for supplying air under pressure to the larger of said air chambers.

2. A seat of the character described comprising, in combination, a seat frame, means operatively connecting the frame and base members including reciprocative piston and cylinder elements defining a pair of spaced apart air containing chambers, air conveying means associated with one of the air chambers including valve elements rendered effective by the relative movements of the piston and chamber for controlling the passage of atmospheric air to and from said chamber whereby said relative movement will be restricted in one direction, said other chamber having a quantity of oil therein the amount of which may be varied to vary the effective air volumetric capacity of said other chamber and means including pump members in connection with the base chamber and piston elements actuated by the relative movement of the piston and cylinder elements for lubrication of said latter elements with said oil.

3. A pneumatic seat for vehicle use comprising, in combination, a seat frame member, a base member and pneumatic means between said members adapted to minimize the transmission of road shock to the driver of the vehicle comprising a piston element and a cylinder element, one of said elements being movable relative to the other and the seat frame being carried by said movable element, said movable element having a chamber on the downward movement side thereof into which air under pressure may be delivered, said chamber being of large volume as compared to the area of said movable element exposed to the pressure in said chamber, a second chamber on the upward movement side of said movable element, said second chamber being small in volume compared to the volume of said first chamber and means for admitting air to said second chamber when said movable element moves downward.

4. A pneumatic seat in accordance with claim 3 wherein said second chamber has a port of variable cross-sectional area to control the escape of air from said second chamber when said movable element is moving in an upward direction.

5. A pneumatic seat in accordance with claim 3 in which said last mentioned means includes two air inlet openings to said second chamber one of said inlet openings automatically closing when the movable element moves upward and the other being controllable by the user of the seat to throttle the escape of air when the movable element moves upward.

6. A pneumatic seat in accordance with claim 3 wherein a pump is provided to vary the volume of air in said first chamber in accordance with the weight of the person to occupy said seat.

7. A pneumatic seat wherein the level of the seat may be adjusted upward or downward with relation to a steering wheel to suit the physical characteristics of the user as to height and weight, in combination, a seat frame member, a base member and pneumatic means between said members adapted to minimize the transmission of road shocks to the driver of the vehicle comprising a piston element and a cylinder element, one of said elements being movable realtive to the other and the seat frame being carried by said movable element, said movable element having a chamber on the downward movement side thereof into which air under pressure may be delivered, said chamber being of large volume and the area of said movable element exposed to the pressure in said large volume chamber being such that the downward deflection of the seat due to road irregularities is minimized, the seat having been adjusted by varying the pressure in said large chamber to suit the height and weight characteristics of the user, to the end that said downward deflection does not carry the user downward to an extent such that road visibility through the windshield is obstructed in any material degree, a second chamber on the upward movement side of said movable element, said second chamber being small in volume compared to the volume of said first chamber and the pressure therein opposing the upward movement of said movable element whereby recoil upward movement of the seat changes the pressure therein rapidly to dampen out said recoil, and means operable by the user and including a connection to atmosphere from said second chamber for controlling the pressure conditions in said second chamber to thereby control the dampening effect.

8. A pneumatic seat in accordance with claim 7 wherein said second chamber is annular in shape.

9. A pneumatic seat in accordance with claim 7 wherein said second chamber is annular in shape and when the seat is in a position of rest with the user seated thereon the height of said annulus is at least as great as its width.

10. A pneumatic seat in accordance with claim 7 wherein substantially atmospheric pressure exists in said second chamber during the downward movement of said movable element and a pressure above atmosphere exists in said second chamber during the upward movement thereof, the degree of which is controllable by said last mentioned means.

11. A pneumatic seat in accordance with claim 7 in which a second connection to atmosphere is provided to said second chamber and a check valve controls the flow of air through said second connection during the downward movement of said movable element.

12. A pneumatic seat in accordance with claim 7 in which a hand pump is provided which upon actuation by the user supplies air under pressure to said first chamber.

13. A pneumatic seat in accordance with claim 7 in which said first chamber is connected to the vehicle air brake reservoir to increase the volume of air therein for user support.

14. A pneumatic seat in accordance with claim 7 wherein a plate of large cross-sectional bearing area is rigidly secured to the upper end of said movable element and means are provided for shifting the seat frame on said plate forwardly and rearwardly with respect to the steering wheel and locking it with respect to said plate in the desired position of use.

15. A pneumatic seat wherein the level of the seat may be adjusted upward or downward with relation to a steering wheel to suit the physical characteristics of the user as to height and weight, in combination, a seat frame, a base member, a housing mounted on said base member, pneumatic means in said housing and between said members adapted to minimize the transmission of road shock to the driver of the vehicle comprising a piston element and a cylinder element, one of said elements being movable relative to the other and the seat frame being carried by said movable element, said movable element having a chamber on the upward movement side thereof, a valve controlled connection between atmosphere and said chamber, a second chamber on the downward movement side of said movable element, said second chamber being of large volume as compared to the volume of said first chamber, and means comprising a hand operated pump for supplying air under pressure to said second chamber.

16. A pneumatic seat in accordance with claim 15 wherein the pump is mounted in said housing and includes a cylinder, a piston operable therein, an intake valve from atmosphere to said cylinder, a discharge valve between said cylinder and said second chamber and means in connection with said discharge valve and actuated by said piston for exhausting air from said second chamber when desired to lower the seat position.

17. A pneumatic seat in accordance with claim 15 wherein the hand operated pump is mounted in said housing and includes a lever projecting upwardly therefrom to a position within reach of the user, wherein the seat frame has a depending slotted member and means are provided between said hand lever and the margins of said slotted member enabling said slotted member to reciprocate with respect to said hand lever while preventing rotation of the seat frame with respect to the base member.

18. A pneumatic seat for vehicle use comprising, in combination, a seat frame, a base and pneumatic means between said frame and base for minimizing the transmission of road shock to the driver of the vehicle comprising a cylinder having a piston operable therein and said seat being carried by said piston, said piston having a large volume chamber on its lower side and a small volume chamber on its upper side and said piston having a larger area of exposure to said lower side chamber pressure than to said upper side chamber pressure.

19. A pneumatic seat in accordance with claim 18 wherein upper piston side chamber has means for admitting air at atmospheric pressure when the piston moves downward and a throttling valve to control the escape of air from said upper piston side chamber when the piston is moving upward.

20. A pneumatic seat in accordance with claim 18 in which means are provided for charging the lower piston side chamber with air under pressure.

21. A pneumatic seat in accordance with claim 18 in which an oil pump is provided for lubricating the piston and cylinder wall, said oil pump comprising two telescopic members one carried by the base and the other carried by the piston and means for admitting oil to said telescopic members and discharging it therefrom.

References Cited in the file of this patent

UNITED STATES PATENTS

| 338,895 | Weeden | Mar. 30, 1886 |
| 900,945 | Mills | Oct. 13, 1908 |

(Other references on following page)

UNITED STATES PATENTS

| | | | |
|---|---|---|---|
| 1,281,041 | MacKinnon | Oct. 8, | 1918 |
| 1,446,833 | Carlson | Feb. 27, | 1923 |
| 1,898,444 | Hawkins | Feb. 21, | 1933 |
| 1,951,375 | Schwartzkopf, et al. | Mar. 20, | 1934 |
| 1,951,508 | Emmert | Mar. 20, | 1934 |
| 2,085,475 | Saives | June 29, | 1937 |
| 2,260,032 | Kaiser et al. | Oct. 21, | 1941 |
| 2,278,049 | Ferbee | Mar. 31, | 1942 |
| 2,283,761 | Richter | May 19, | 1942 |
| 2,484,722 | Nickelsen et al. | Oct. 11, | 1949 |
| 2,486,048 | McIntyre et al. | Oct. 25, | 1949 |
| 2,500,316 | Kramer | Mar. 14, | 1950 |
| 2,596,033 | King | May 6, | 1952 |
| 2,629,426 | Hawkins | Feb. 24, | 1953 |

FOREIGN PATENTS

| | | | |
|---|---|---|---|
| 34,267 | Netherlands | Dec. 15, | 1934 |
| 117,466 | Sweden | Oct. 22, | 1946 |
| 423,050 | Germany | Dec. 18, | 1925 |